(12) United States Patent
Chang et al.

(10) Patent No.: US 7,753,548 B2
(45) Date of Patent: Jul. 13, 2010

(54) INPUT DEVICE HAVING INDICATING LAMP

(75) Inventors: A-Ming Chang, Taipei (TW);
Chou-Liang Liu, Taipei (TW);
Ying-Che Tseng, Taipei (TW);
Chien-Pang Chien, Taipei (TW);
Chih-Wen Su, Taipei (TW)

(73) Assignee: Primax Electronics Ltd., Taipei (TW)

( * ) Notice: Subject to any disclaimer, the term of this patent is extended or adjusted under 35 U.S.C. 154(b) by 208 days.

(21) Appl. No.: 12/196,023

(22) Filed: Aug. 21, 2008

(65) Prior Publication Data
US 2009/0316428 A1 Dec. 24, 2009

(30) Foreign Application Priority Data
Jun. 20, 2008 (TW) ............................... 97123119 A

(51) Int. Cl.
*F21V 8/00* (2006.01)
(52) U.S. Cl. ...................... 362/109; 362/555; 362/577

(58) Field of Classification Search .................. 362/109, 362/231, 311.02, 311.06, 555, 577
See application file for complete search history.

(56) References Cited

U.S. PATENT DOCUMENTS

| 7,128,431 | B2 * | 10/2006 | Ludewig et al. | 362/555 |
| 7,129,929 | B1 * | 10/2006 | Bohn | 345/166 |
| 2004/0041798 | A1 * | 3/2004 | Kim | 345/179 |
| 2007/0019433 | A1 * | 1/2007 | Lowles | 362/555 |

* cited by examiner

*Primary Examiner*—David V Bruce
(74) *Attorney, Agent, or Firm*—Kirton & McConkie; Evan R. Witt

(57) ABSTRACT

The present invention relates to an input device having an indicating lamp. The input device includes a case and an electronic lighting module. The electronic lighting module includes a printed circuit board, an electronic lighting element and a light guide post. The light guide post has a crooked shape. Due to the crooked shape, the light beams emitted by the electronic lighting element are no longer focused as a spot on the surface of the case.

14 Claims, 5 Drawing Sheets

INPUT DEVICE HAVING INDICATING LAMP

FIELD OF THE INVENTION

The present invention relates to an input device, and more particularly to an input device having an indicating lamp.

BACKGROUND OF THE INVENTION

Nowadays, with increasing development of high technology industries, electronic devices are widely used in our daily lives. For most electronic devices, a variety of electronic lighting elements are used to generate light signals to notify the user. For example, a red light signal is shown if an electric hot-water heater is cooking water. After the water contained in the electric hot-water heater has been boiled, the red light signal is switched to a green light signal to notify the user that the water has been boiled and is now feasible to drink. The examples of using electronic lighting elements in electronic devices to notify the users are too numerous to be enumerated. For example, electronic lighting elements may be utilized in computer systems and the peripheral devices thereof. As known, an input device such as a mouse is an important peripheral device of a computer for establishing contact between the computer and the user. The mouse has an indicating lamp to emit light signals to notify the user of different operating statuses of the mouse.

Hereinafter, an input device having an indicating lamp and the operations of the input device will be illustrated in more details with reference to FIG. 1. FIG. 1 is a schematic exploded view of an input device having an indicating lamp according to the prior art. The input device 1 principally comprises a case 14 and an electronic lighting module. A case perforation 141 is formed in the case 14. The electronic lighting module comprises a printed circuit board 10, an electronic lighting element 11, a light guide post 13 and a lamp cover 16. The electronic lighting element 11 is disposed on the printed circuit board 10 for emitting light beams. The light guide post 13 is arranged between the case 14 and the electronic lighting element 11 for guiding the light beams. For assembling the input device 1, an end of the light guide post 13 is contacted with the electronic lighting element 11 and the other end of the light guide post 13 is inserted into the case perforation 141. The length H1 of the light guide post 13 is substantially identical to the vertical distance between the electronic lighting element 11 and the case perforation 141. In addition, the electronic lighting element 11 is aligned with the case perforation 141. That is, the electronic lighting element 11 and the case perforation 141 are arranged along the same vertical line. The lamp cover 16 is disposed on the surface of the case 14 and shelters the case perforation 141 from being exposed. During operation of the input device 1, the electronic lighting element 11 emits light beams. Since the electronic lighting element 11 is contacted with the light guide post 13, the light beams are guided by the light guide post 13 to the case perforation 141. Since the lamp cover 16 is made of transparent material, the light beams finally penetrate through the lamp cover 16 so as to indicate a light signal on the surface of the input device 1.

The conventional input device having an indicating lamp, however, still has some drawbacks. For example, the light beams are not uniformly distributed on the lamp cover. Due to a light gathering property of the electronic lighting element, the majority of the light beams emitted by the electronic lighting element are focused on a spot. The light beams are then conducted through the light guide post to the lamp cover such that the light beams are not uniformly distributed on the lamp cover. Under this circumstance, the light signal is not pleasing to the eye and readily discomforts the vision of the user.

Therefore, there is a need of providing an input device having an indicating lamp for uniformly displaying the light signal so as to obviate the drawbacks encountered from the prior art.

SUMMARY OF THE INVENTION

It is an object of the present invention to provide an input device having an indicating lamp for uniformly displaying the light signal.

In accordance with an aspect of the present invention, there is provided an input device having an indicating lamp. The input device includes a case and an electronic lighting module. The case has a case perforation therein. The electronic lighting module includes a printed circuit board, an electronic lighting element arranged on the printed circuit board for emitting light beams, and a light guide post for guiding the light beams. The light guide post has an end contacted with the electronic lighting element and the other end inserted into the case perforation. The light guide post has a length greater than a vertical distance between the case perforation and the electronic lighting element.

In an embodiment, the input device further includes a lamp cover, which is disposed on a surface of the case, for sheltering the case perforation.

In an embodiment, the light guide post has a crooked shape.

In an embodiment, an angle is defined between the light guide post and the vertical line downwardly extended from the case perforation.

Preferably, the input device is a mouse.

Preferably, the electronic lighting element is a light emitting diode (LED).

In accordance with another aspect of the present invention, there is provided an input device having a multi-stage indicating lamp. The input device includes a case and an electronic lighting module. The case has multiple case perforations therein. The electronic lighting module includes a printed circuit board, a first electronic lighting element arranged on the printed circuit board for emitting first light beams, a second electronic lighting element arranged on the printed circuit board for emitting second light beams, and a light guide member. The light guide member includes a light guide platform, multiple upper light guide posts for guiding the first and second light beams, and multiple lower light guide posts for guiding the first and second light beams. The upper light guide posts have respective first ends inserted into respective case perforations. The lower light guide posts have respective second ends contacted with the first and second electronic lighting elements. The number of the upper light guide posts is equal to the number of the lower light guide posts. The light guide member has a length greater than a vertical distance between the first electronic lighting element and the corresponding case perforation.

In an embodiment, the input device further includes a light-shielding member arranged between the light guide member and the printed circuit board. The light-shielding member has multiple channels. The lower light guide posts are inserted into corresponding channels.

In an embodiment, the input device further includes a lamp cover, which is disposed on a surface of the case, for sheltering the case perforations.

In an embodiment, the lower light guide posts of the light guide member have crooked shapes.

In an embodiment, an angle is defined between each of the lower light guide posts of the light guide member and the vertical line downwardly extended from the corresponding case perforation.

Preferably, the input device is a mouse.

Preferably, the first electronic lighting element is a light emitting diode (LED).

Preferably, the second electronic lighting element is a light emitting diode (LED).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
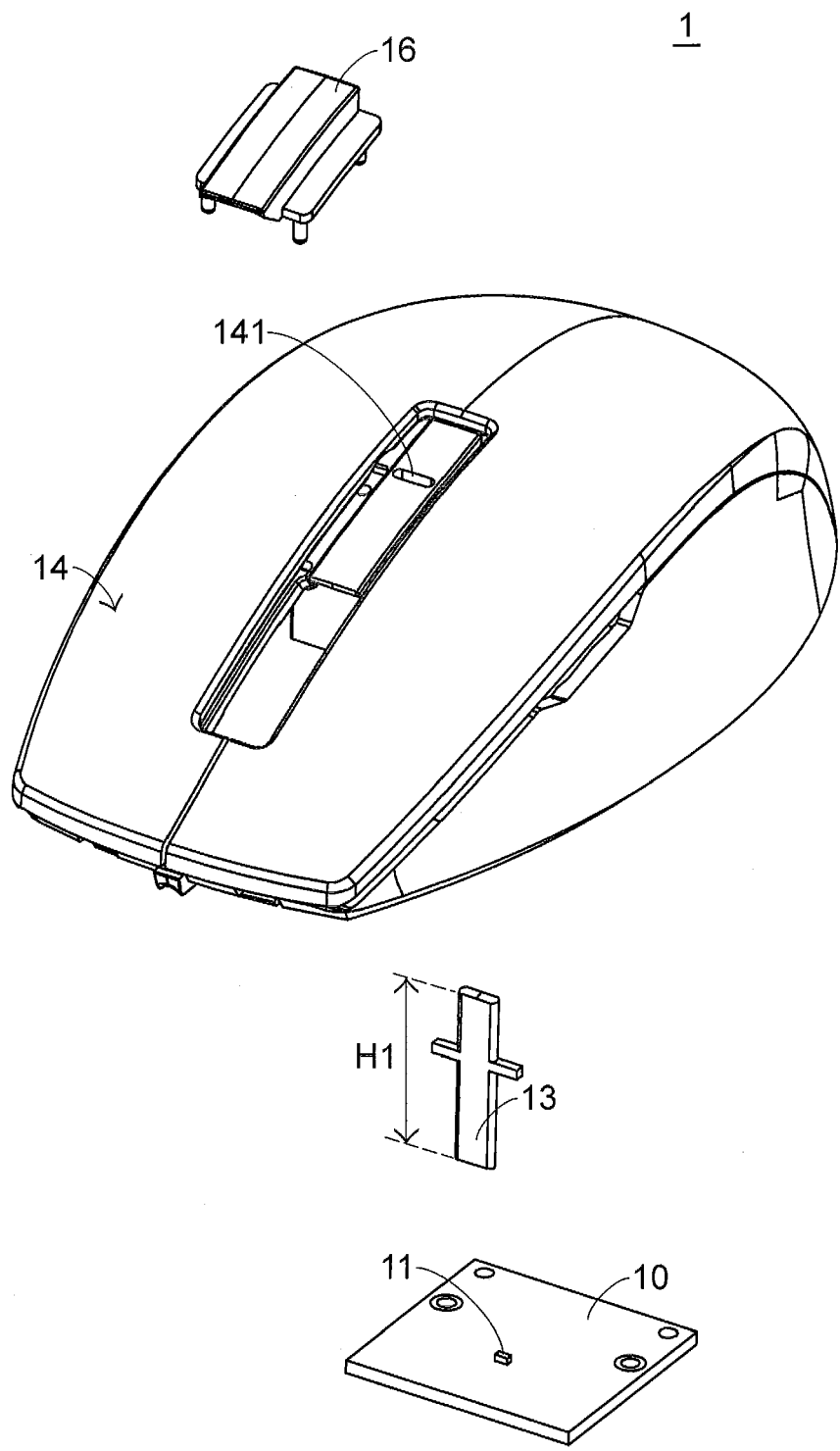
FIG. 1 is a schematic exploded view of an input device having an indicating lamp according to the prior art.
Figure 2:
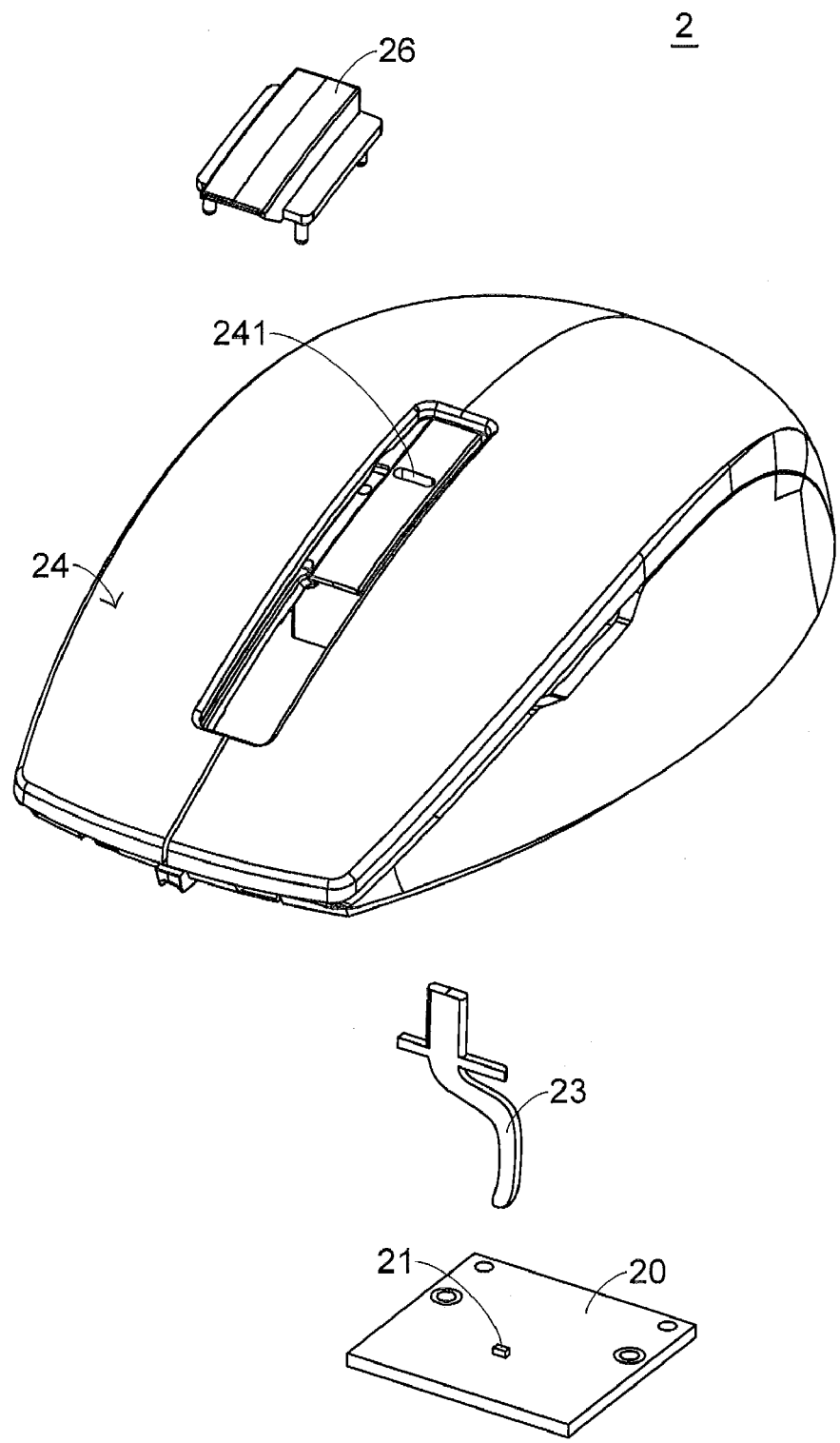
FIG. 2 is a schematic exploded view of an input device having an indicating lamp according to a first preferred embodiment of the present invention.
Figure 3:
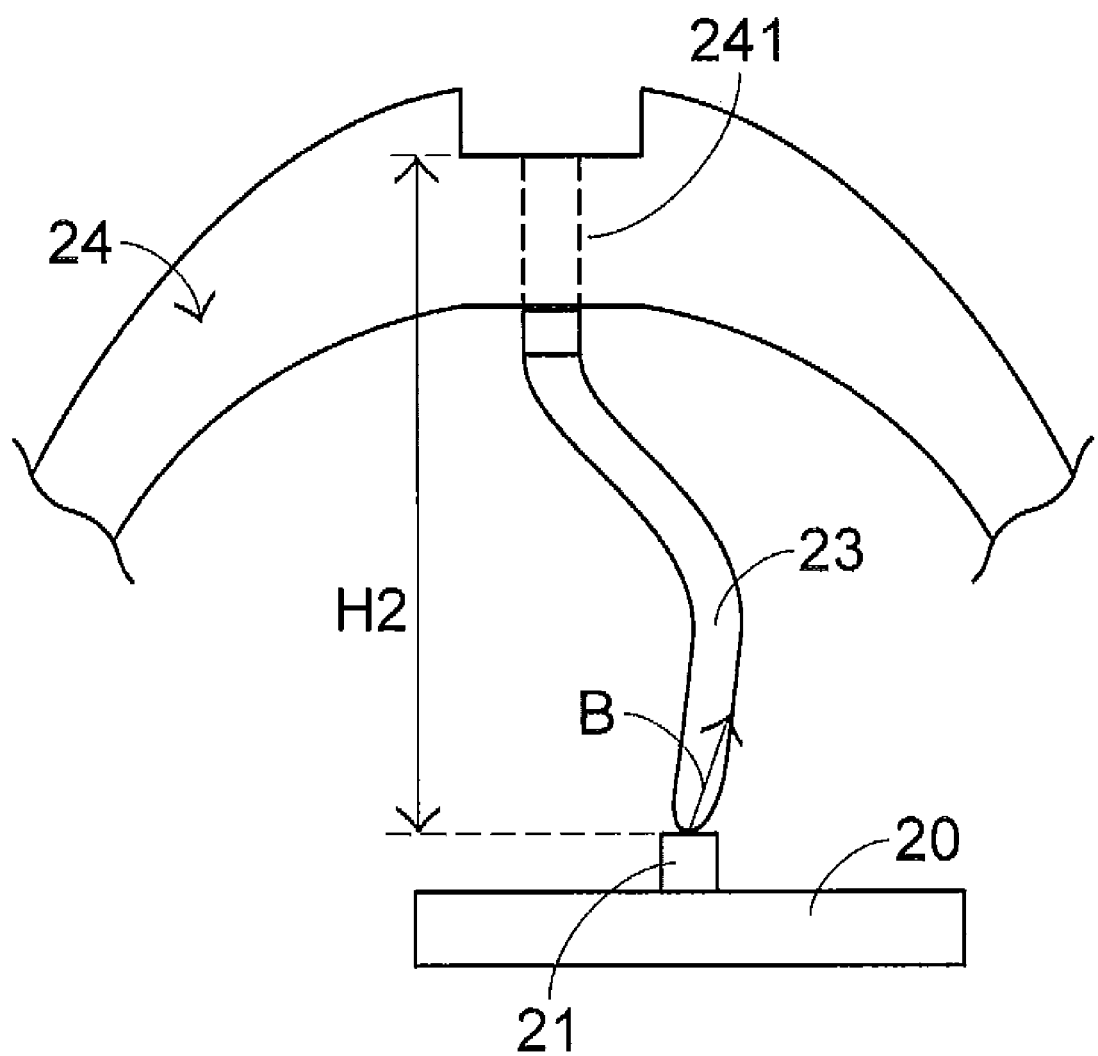
FIG. 3 is a schematic cross-sectional view of the input device having an indicating lamp according to the first preferred embodiment of the present invention.

FIG. 2 is a schematic exploded view of an input device having an indicating lamp according to a first preferred embodiment of the present invention. In this embodiment, the input device 2 principally comprises a case 24 and an electronic lighting module. A case perforation 241 is formed in the case 24. The electronic lighting module comprises a printed circuit board 20, an electronic lighting element 21, a light guide post 23 and a lamp cover 26. The electronic lighting element 21 is disposed on the printed circuit board 20 for emitting light beams B (as is also shown in FIG. 3). An exemplary electronic lighting element 21 is a light emitting diode (LED). The light guide post 23 is arranged between the case 24 and the electronic lighting element 21 for guiding the light beams B. For assembling the input device 2, an end of the light guide post 23 is contacted with the electronic lighting element 21 and the other end of the light guide post 23 is inserted into the case perforation 241. In order to preventing the light beams emitted by the electronic lighting element 21 from being focused as a spot on the surface of the input device 2, the light guide post 23 for guiding the light beams B is modified. In accordance with a key feature of the present invention, the length of the light guide post 23 is greater than the vertical distance H2 between the electronic lighting element 21 and the case perforation 241. The vertical distance H2 denotes the imaginary distance between the electronic lighting element 21 and the case perforation 241 if the electronic lighting element 21 and the case perforation 241 are arranged along the same vertical line. In other words, the light guide post 23 may have any crooked shape, as is shown in FIG. 2. Alternatively, the electronic lighting element 21 is not necessarily aligned with the case perforation 241. The electronic lighting element 21 and the case perforation 241 are arranged along different vertical lines and the electronic lighting element 21 is horizontally deviated from the case perforation 241 such that the light guide post 23 is a tilted elongate strip. The shape of the light guide post 23 and the position of the case perforation 241 relative to the light guide post 23 are not restricted as long as the length of the light guide post 23 is greater than the vertical distance H2 between the electronic lighting element 21 and the case perforation 241. In other words, the light guide post 23 may have an arbitrary shape with the proviso that the length of the light guide post 23 is greater than the vertical distance H2 between the electronic lighting element 21 and the case perforation 241.

FIG. 3 is a schematic cross-sectional view of the input device having an indicating lamp according to the first preferred embodiment of the present invention. Please refer to FIGS. 2 and 3. During operation of the input device 2, the electronic lighting element 21 emits light beams B. Since the electronic lighting element 21 is contacted with the light guide post 23, the light beams B are guided by the light guide post 23 to the case perforation 241. Due to the crooked shape of the light guide post 23, some of the light beams B are focused on the light guide post 23. The remaindering portions of the light beams B are not focused by the light guide post 23 but are guided to the case perforation 241 through the light guide post 23. Since the lamp cover 26 is made of transparent material, the light beams B finally penetrate through the lamp cover 26 so as to indicate a light signal on the surface of the input device 2. Under this circumstance, the light beams B are no longer focused as a spot on the surface of the input device 2.

Figure 4:
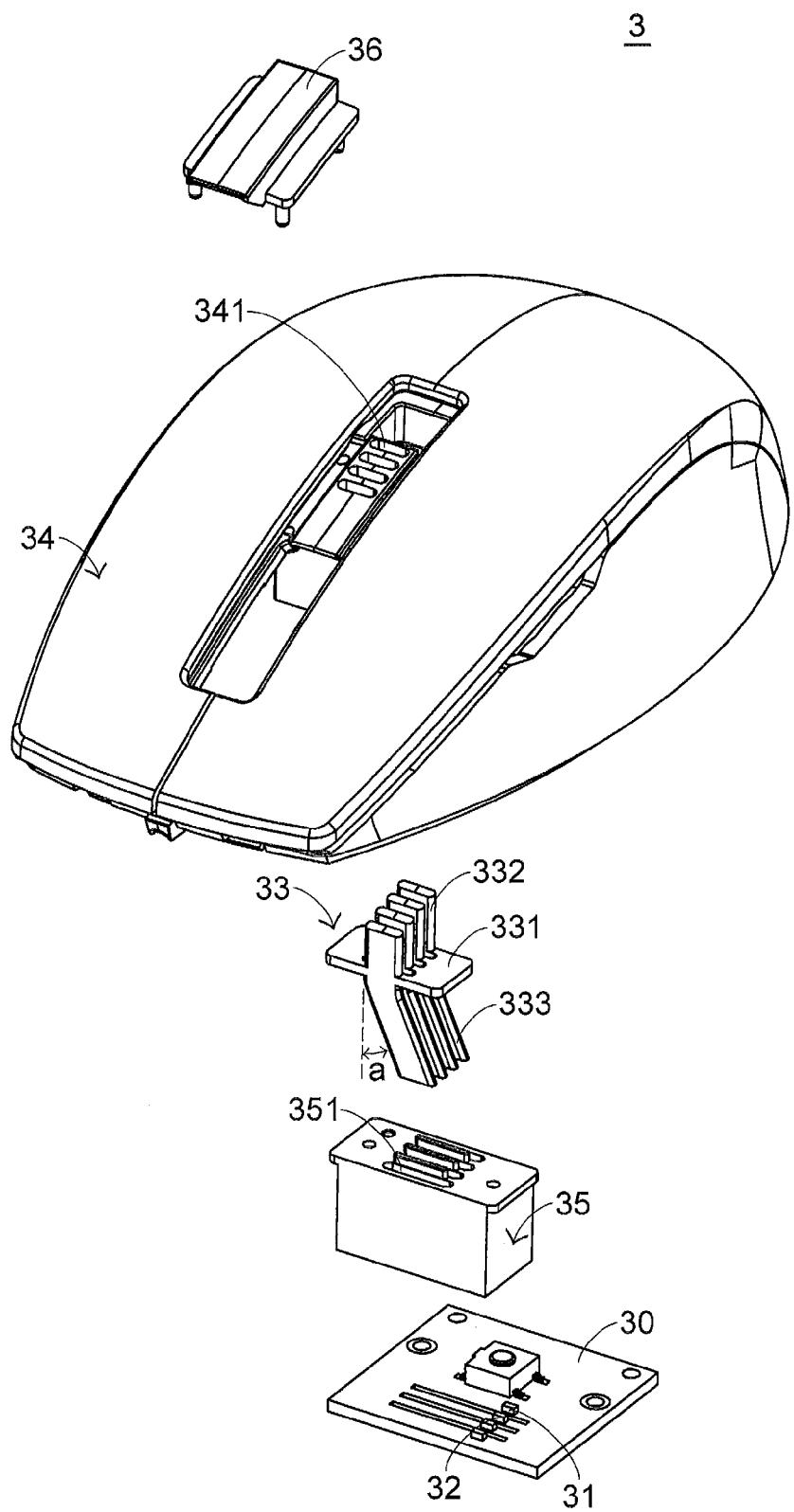
FIG. 4 is a schematic exploded view of an input device having an indicating lamp according to a second preferred embodiment of the present invention.

The operations and working principles of the input device having an indicating lamp according to the first preferred embodiment of the present invention have been illustrated as above. Nevertheless, the above concept is applicable to an input device having a multi-stage indicating lamp. Referring to FIG. 4, an exploded view of an input device having a multi-stage indicating lamp according to a second preferred embodiment of the present invention. As shown in FIG. 4, the input device 3 principally comprises a case 34 and an electronic lighting module. A plurality of case perforations 341 are formed in the case 34. The electronic lighting module comprises a printed circuit board 30, a first electronic lighting element 31, a second electronic lighting element 32, a light guide post member 33, a light-shielding member 35 and a lamp cover 36. The first electronic lighting element 31 and the second electronic lighting element 32 are disposed on the printed circuit board 30 for emitting first and second light beams, respectively. Examples of the first electronic lighting element 31 and the second electronic lighting element 32 are light emitting diodes (LEDs). The light guide member 33 is used for guiding the first and second light beams. The light guide member 33 comprises a light guide platform 331, multiple upper light guide posts 332 and multiple lower light guide posts 333. The lower light guide posts 333 have respective ends contacted with the first electronic lighting element 31 and the second electronic lighting element 32. The upper light guide posts 332 have respective ends inserted into the case perforations 341. The number of the upper light guide posts 332 is equal to the number of the lower light guide posts 333. In addition, the number of the upper light guide posts 332 is equal to the number of the case perforations 341. The light-shielding member 35 are arranged between the light guide member 33 and the printed circuit board 30 for preventing the light beams emitted by the first electronic lighting element 31 and the second electronic lighting element 32 from being interfered with each other. The light-shielding member 35 has several channels 351. The lower light guide posts 333 are inserted into corresponding channels 351 such that the light beams emitted by the first electronic lighting element 31 and the second electronic lighting element 32 are shielded by the sidewalls of the channels 351.

In accordance with a key feature of the present invention, the length of the light guide member 33 is greater than the vertical distance between the first electronic lighting element 31 and the corresponding case perforation 341. More especially, the lower light guide posts 333 of the light guide member 33 are tilted such that an angle "a" is defined between each of the lower light guide posts 333 and the vertical line downwardly extended from the case perforations 341. The vertical line downwardly extended from the case perforations 341 is substantially parallel with the length direction of the upper light guide posts 332. In other words, each of the lower light guide posts 333 is substantially a tilted elongate strip. The first electronic lighting element 31 and the second electronic lighting element 32, which are disposed on the printed circuit board 30, and corresponding case perforations 341 are arranged along different vertical lines. Since the first electronic lighting element 31 and the second electronic lighting element 32 are contacted with different lower light guide posts 333, the first electronic lighting element 31 and the second electronic lighting element 32 are horizontally deviated from the case perforations 341, as can be seen in FIG. 4. The operations of the input device 3 are identical to those of the input device 2 shown in the first preferred embodiment, and are not redundantly described herein. In particular, the directions of the light beams emitted by the electronic lighting elements 31 are not parallel with the upper light guide posts 332 in order to avoid the light gathering effect.

Figure 5:
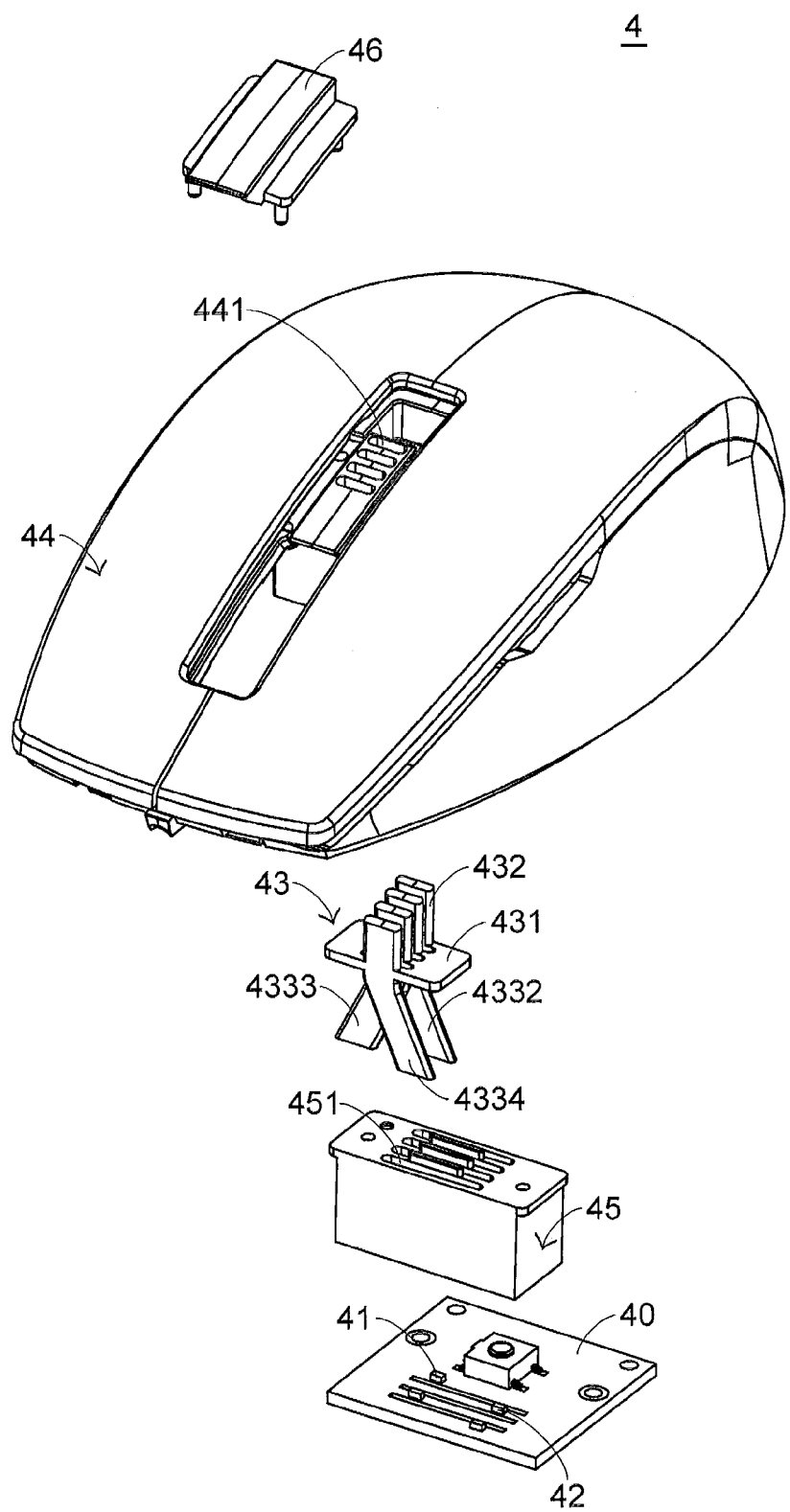
FIG. 5 is a schematic exploded view of an input device having an indicating lamp according to a third preferred embodiment of the present invention.

It is noted that, however, those skilled in the art will readily observe that numerous modifications and alterations of the light guide member may be made while retaining the teachings of the invention. FIG. 5 is a schematic exploded view of an input device having an indicating lamp according to a third preferred embodiment of the present invention. Like the second preferred embodiment, the input device 4 of the third preferred embodiment principally comprises a case 44 and an electronic lighting module. A plurality of case perforations 441 are formed in the case 44. The electronic lighting module comprises a printed circuit board 40, a first electronic lighting element 41, a second electronic lighting element 42, a light guide post member 43, a light-shielding member 45 and a lamp cover 46. The light guide member 43 comprises a light guide platform 431, multiple upper light guide posts 432 and multiple lower light guide posts 433. The multiple lower light guide posts 433 comprises a first lower light guide post (not shown), a second lower light guide post 4332, a third lower light guide post 4333 and a fourth lower light guide post 4334. The first lower light guide posts and the third lower light guide post 4333 are tilted to the right side of the input device 4 such that an angle is defined between each of the first lower light guide posts and the third lower light guide post 4333 and the vertical line downwardly extended from corresponding case perforations 441. Similarly, the second lower light guide post 4332 and the fourth lower light guide post 4334 are tilted to the left side of the input device 4 such that an angle is defined between each of the second lower light guide post 4332 and the fourth lower light guide post 4334 and the vertical line downwardly extended from corresponding case perforations 441. It is of course that the light-shielding member 45 and the printed circuit board 430 are modified depending on the lower light guide posts 433.

From the above description, the light beams are no longer focused as a spot on the surface of the case by using an improved light guide post to guide the light beams. Consequently, the problem of causing light gathering property occurred in the conventional light guide post is overcome. Since the light beams are uniformly distributed on the lamp cover and the luminance of the indicating lamp is reduced, the light signal becomes pleasing to the eye and thus comforts the vision of the user. In comparison with the prior art, the present invention can obviate the drawbacks encountered from the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An input device having an indicating lamp, said input device comprising:
   a case having a case perforation therein; and
   an electronic lighting module comprising a printed circuit board, an electronic lighting element arranged on said printed circuit board for emitting light beams, and a light guide post for guiding said light beams, wherein said light guide post has an end contacted with said electronic lighting element and the other end inserted into said case perforation, and said light guide post has a length greater than a vertical distance between said case perforation and said electronic lighting element.

2. The input device having an indicating lamp according to claim 1 further comprising a lamp cover, which is disposed on a surface of said case, for sheltering said case perforation.

3. The input device having an indicating lamp according to claim 1 wherein said light guide post has a crooked shape.

4. The input device having an indicating lamp according to claim 1 wherein an angle is defined between said light guide post and the vertical line downwardly extended from said case perforation.

5. The input device having an indicating lamp according to claim 1 wherein said input device is a mouse.

6. The input device having an indicating lamp according to claim 1 wherein said electronic lighting element is a light emitting diode (LED).

7. An input device having a multi-stage indicating lamp, said input device comprising:
   a case having multiple case perforations therein; and
   an electronic lighting module comprising a printed circuit board, a first electronic lighting element arranged on said printed circuit board for emitting first light beams, a second electronic lighting element arranged on said printed circuit board for emitting second light beams, and a light guide member comprising a light guide platform, multiple upper light guide posts for guiding said first and second light beams, and multiple lower light guide posts for guiding said first and second light beams, wherein said upper light guide posts have respective first ends inserted into respective case perforations, said lower light guide posts have respective second ends contacted with said first and second electronic lighting elements, the number of said upper light guide posts is equal to the number of said lower light guide posts, and said light guide member has a length greater than a vertical distance between said first electronic lighting element and said corresponding case perforation.

8. The input device having a multi-stage indicating lamp according to claim 7 further comprising a light-shielding member arranged between said light guide member and said printed circuit board, wherein said light-shielding member has multiple channels, and said lower light guide posts are inserted into corresponding channels.

9. The input device having a multi-stage indicating lamp according to claim 7 further comprising a lamp cover, which is disposed on a surface of said case, for sheltering said case perforations.

10. The input device having a multi-stage indicating lamp according to claim 7 wherein said lower light guide posts of said light guide member have crooked shapes.

11. The input device having a multi-stage indicating lamp according to claim 7 wherein an angle is defined between each of said lower light guide posts of said light guide member and the vertical line downwardly extended from said corresponding case perforation.

12. The input device having a multi-stage indicating lamp according to claim 7 wherein said input device is a mouse.

13. The input device having a multi-stage indicating lamp according to claim 7 wherein said first electronic lighting element is a light emitting diode (LED).

14. The input device having a multi-stage indicating lamp according to claim 7 wherein said second electronic lighting element is a light emitting diode (LED).

* * * * *